United States Patent [19]

McCartney

[11] Patent Number: 4,479,719

[45] Date of Patent: Oct. 30, 1984

[54] DRINK MIXING APPARATUS

[76] Inventor: David B. McCartney, 4596 Manitoa Rd., Excelsior, Minn. 55331

[21] Appl. No.: 411,683

[22] Filed: Aug. 26, 1982

[51] Int. Cl.³ .................................................. B01F 15/00
[52] U.S. Cl. ..................................... 366/130; 206/219; 220/902
[58] Field of Search ............... 366/129, 130, 348, 349; 215/100.5; 220/902; 206/219

[56] References Cited

U.S. PATENT DOCUMENTS

| | | | |
|---|---|---|---|
| 2,955,722 | 10/1960 | Antonious | 215/100.5 |
| 2,974,814 | 3/1961 | Parsons | 215/100.5 |
| 3,161,394 | 12/1964 | Savitt | 215/100.5 |
| 3,357,590 | 12/1967 | Safford | 215/100.5 |
| 3,655,089 | 4/1972 | Tower | 215/100.5 |
| 4,008,347 | 2/1977 | Amberg | 220/902 |
| 4,322,954 | 4/1982 | Sheehan | 220/902 |

*Primary Examiner*—Robert W. Jenkins
*Attorney, Agent, or Firm*—Hugh D. Jaeger

[57] ABSTRACT

Drink mixing apparatus including a preformed circular container cover, a container, and a circular or like base. The container cover is substantially circular including a preformed indentation for accepting and engaging against a lip of a container and is a closed-cell foam with a laminated film on both sides. The container can be a shake container or shot glass. The base is circular or the like geometrical configuration of closed-cell foam. In mixing, the preformed container cover and container are slammed with a hand motion onto the base, causing effervescence of the contents of the container, usually a liquor and carbonated liquid. The base and cover can be of PVC closed-cell foam or the like.

5 Claims, 3 Drawing Figures

DRINK MIXING APPARATUS

BACKGROUND OF THE INVENTION

1. Field of the Invention

The present invention relates to mixing apparatus and, more particularly, pertains to drink mixing apparatus for liquor and carbonated liquid.

2. Description of the Prior Art

The prior art drink mixing apparatus has failed to provide a slammer or quick hand motion type of mixing apparatus for the connoisseurs of spirits and the like.

The prior art mixing apparatuses have usually consisted of blenders or hand shakers which lack substance as well as forethought. The prior art mixing systems have usually employed brute force and have not consisted of a gentle hand motion with a brunting force for combination of the liquids at an instant providing for combination and effervescent quality.

The present invention overcomes the deficiencies of the prior art by providing a rapid and efficient drink mixing apparatus.

SUMMARY OF THE INVENTION

The general purpose of the present invention is to provide a drink mixing apparatus of three components which can be appropriately packaged and displayed for use by an individual or a drinking establishment. The components also lend themselves to sale by the purveyor of wines and spirits.

According to one embodiment of the present invention there is provided a combination of three mixing components, a first component of a closed-cell foam preformed die-cut container cover including urethane film laminated on two sides, a preformed circular groove molded into one side thereof for accepting and engaging the lip of the container, a container such as a shake container or shot glass having a circular lip for engagement into the groove in the cover, and a base of vinyl closed-cell foam with a urethane film or the like laminated on two sides, but not requiring a film, whereby the liquor and liquid such as carbonated liquid are poured into the container, the cover is positioned over the container engaging the preformed groove to the lip, and with hand or mechanical motion forcing the contents down onto a surface, thereby effervescing and mixing the liquids instantly and rapidly providing for mixing of the drink.

A significant aspect and feature of the present invention is a drink mixing apparatus which is utilized by anyone with no bartending or the like skills. The apparatus can be appropriately sold to the social drinker for use in residences, on the road, or at parties.

Another significant aspect and feature of the present invention is a drink mixing apparatus which lends itself to merchandising through blister packeting or packaging in a plastic type of container similar to those for the carrying of bottles and mixing apparatus. The mixing apparatus includes two closed-cell foam members which can be easily inserted within a larger shake container or can accompany a shot glass container.

Having thus described the invention, it is the principal object hereof to provide drink mixing apparatus, a combination of a preformed container cover, container, and container base for effervescing and mixing the liquids in the container which are enclosed and protected by the container cover.

An object of the present invention is to provide instant and rapid mixing of two or more liquids in a container, whether the container be a mix, shake, or shot glass container for mixing of liquors and carbonated or the like liquids.

Another object of the present invention is to provide a mixing system which produces constant mixing in least minimal time with least minimal effort by a connoisseur of predetermined quantities of liquor and the like.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF PREFERRED EMBODIMENTS

Figure 1:
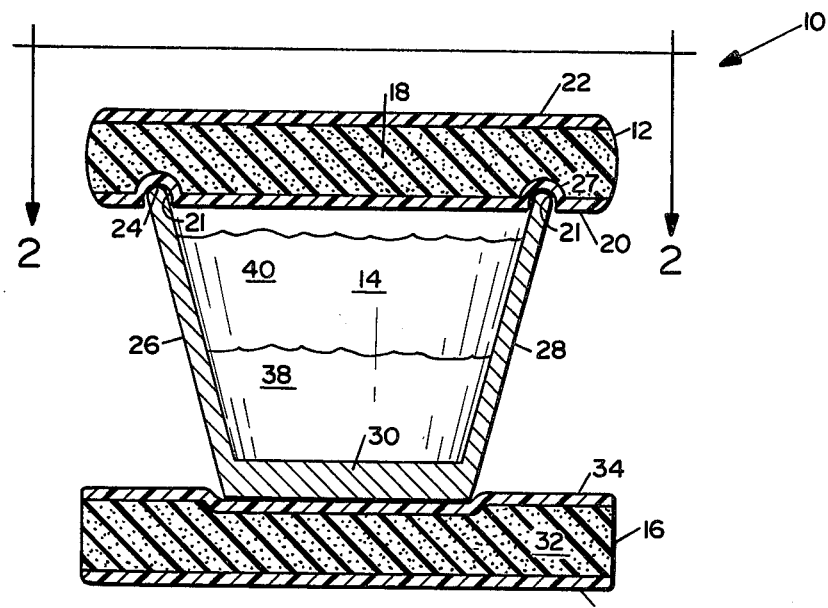
FIG. 1 illustrates a combination of mixing apparatus including a sectional view of preformed container cover, a container, and a container base.

FIG. 1 illustrates a plan view of drink mixing apparatus 10 including a container cover 12, a container 14, and a container base 16. All of the members 12–16 are now described in detail.

The container cover 12 is a vinyl, closed-cell foam 18 with urethane film 20 and 22 laminated on both sides thereof. Through a process of heat and pressure, the cover 12 includes a circular or semi-circular groove 22 positioned about a circumference of the cover for accepting a lip 24 of the container 14. The groove 22 projects inwardly into the cover 12 and appropriate depth 26 providing for acceptance and engagement over the lip 24 of the container 14. While the cover is illustrated as a circular member, any predetermined geometrical symmetry can be realized and is not to be construed as limiting of the invention, as such is by way of example and for purposes of illustration only. The groove is 1/16" to ¼" deep, preferably ⅛" while the cover diameter is 3 to 6", preferably 3.5".

The container 14 includes the lip 24, the sides 26 and 28, the container and a base 30. The container can be the familiar shake or malt type container or a shot glass. The inside of the container holds a plurality of liquids such as a liquor and carbonated beverage, any combination of liquors, or any combination of liquors and other beverages to be mixed.

The pad, or also noted as the container base, 16 is a vinyl, closed-cell foam 32 with a urethane film 34 and 36 laminated on both sides thereof. The pad 16 is ⅜" thick and six inches circular on a side.

Figure 2:
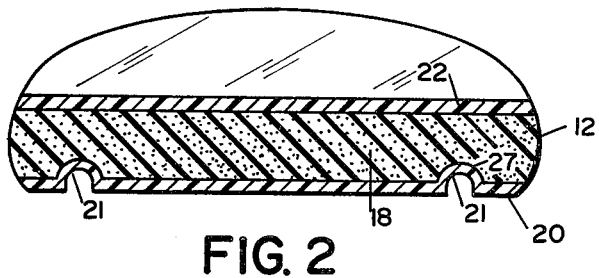
FIG. 2 illustrates a sectional view taken along line 2—2 of FIG. 1 of the container cover; and, FIG. 3 illustrates a perspective view of the base cover.

FIG. 2 illustrates a sectional view taken along line 2—2 of FIG. 1 where all numerals correspond to those elements previously delineated. Particular attention is pointed to the groove 22 and its depth 26.

Figure 3:
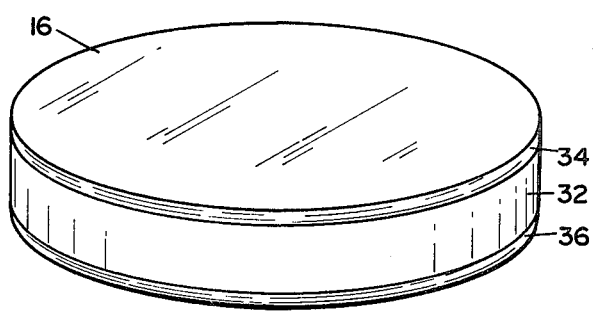

FIG. 3 illustrates a perspective view of the cover 16 including the close cell foam 32, and the films 34 and 36.

MODE OF OPERATION

In operation, the mixing of drinks is begun by pouring of liquors or beverages such as a liquor and a carbonated beverage into the container 14. The cover is positioned over the container where the groove 22 positions over the lip 24 of the container 14. The cover 12 and container 14 as a unit can be slammed or forced against with impact a hard surface on the pad 16 or the combination of the cover 12-container 14-pad 16 can be as an integral unit and combination of three components forced over a finite, preferably vertical, distance against a hard surface for instant and rapid mixing and possible effervescence, depending upon the carbonation of the beverage or the like, providing for mixing of the drink. Such action is provided by the pad 16 with the contents in the container 14 protected by the cover pad 12. The cover pad provides a certain amount of rebounding of the fluids which are forced upwardly with like and unlike motion components and are rebounded in like velocity from the cover 12.

Two beverages can be mixed such as a liquor 38 and a carbonated liquid 40 in the apparatus.

The container 14 can be a shot glass such as the two-ounce with a heavy base. The cover 12 is the closed-cell foam material with a film laminate on both sides having a dimension of $\frac{3}{8}''\times 2''$ wide for the circular groove and four inches outer diameter. The base 16 can be a six-inch piece of the like closed cell foam material. The liquor can be anyone's favorite brand, while the carbonated substance can be beer, soft drink, or carbonated water.

In operation, the shot glass container 14 is grasped with the thumb and last two fingers while the container cover 12 is held snugly with the index and middle finger to the container 14 with a circular groove 22 mating to the lip 24. The foam material as mentioned can be any suitable like vinyl closed-cell foam with a polyurethane film laminate on both sides having a preferable thickness of $\frac{3}{8}''$ where the base is six inches square or circular for geometrical reasons, while the cover is four inches outer diameter with an inner groove to accommodate the lip of the container. Of course, this is dependent upon the size of the container 14 with respect to the container cover 12.

I claim:

1. In combination, a circular container cover pad, container, and circular base cover pad comprising:
   a. circular container cover including a vinyl closed-cell foam of $\frac{3}{8}''$ thick and 3" diameter, urethane film laminated on both sides thereof, and a single semi-circular groove of two inches projecting inwardly 1/16" to $\frac{1}{4}''$ to said cover for accepting a lip of a container;
   b. container including a lip, sides, and structural base supported for accepting and retaining a plurality of liquids; and,
   c. circular base pad of a smooth vinyl, closed-cell foam of 6" diameter including urethane film laminated on both sides thereof whereby said cover retains said liquid within said container and said pad provides for upward mixing motion of said liquid contents with like and equal reactionary forces thereby providing for rapid mixing of said liquids.

2. Combination of claim 1 wherein said container comprises a shot glass.

3. Combination of claim 1 wherein said container comprises a mixing glass.

4. Combination of claim 1 for mixing a liquor and a carbonated beverage.

5. In combination, a cover container, and base pad comprising:
   a. circular container cover including a vinyl closed-cell foam of $\frac{3}{8}''$ thick and 3" diameter, and a single semi-circular groove of two inches projecting inwardly 1/16" to $\frac{1}{4}''$ to said cover for accepting a lip of a container;
   b. container including a lip, sides, and a structural base support for accepting and retaining a plurality of liquids; and,
   c. circular base cover pad of a smooth vinyl, closed-cell foam wherby said cover retains said liquid within said container and said pad provides for upward mixing motion of said liquid contents with like and equal reactionary forces thereby providing for rapid mixing of said liquids.

* * * * *

UNITED STATES PATENT AND TRADEMARK OFFICE
CERTIFICATE OF CORRECTION

PATENT NO. : 4,479,719

DATED : October 30, 1984

INVENTOR(S) : David B. McCartney

It is certified that error appears in the above-identified patent and that said Letters Patent are hereby corrected as shown below:

```
Column 2, line 39, change "22" to --21--.
Column 2, line 41, change "22" to --21--.
Column 2, line 43, change "26" to --27--.
Column 2, line 66, change "22" to --21--.
Column 2, line 66, change "26" to --27--.
Column 3, line 6, change "22" to --21--.
Column 3, line 37, change "22" to --21--.
```

Signed and Sealed this

Eighteenth Day of June 1985

[SEAL]

*Attest:*

DONALD J. QUIGG

*Attesting Officer*  *Acting Commissioner of Patents and Trademarks*